United States Patent Office 2,774,613
Patented Dec. 18, 1956

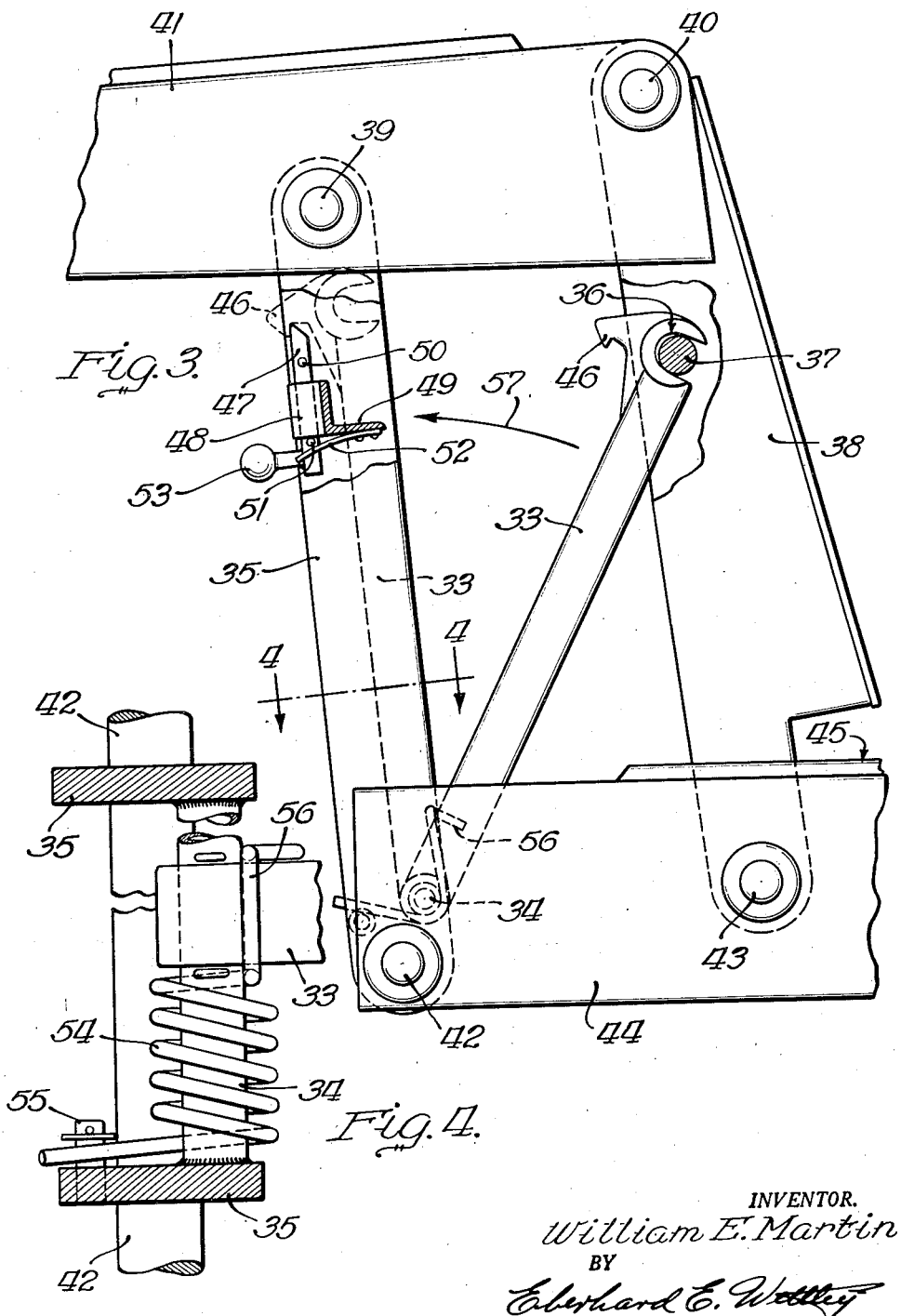

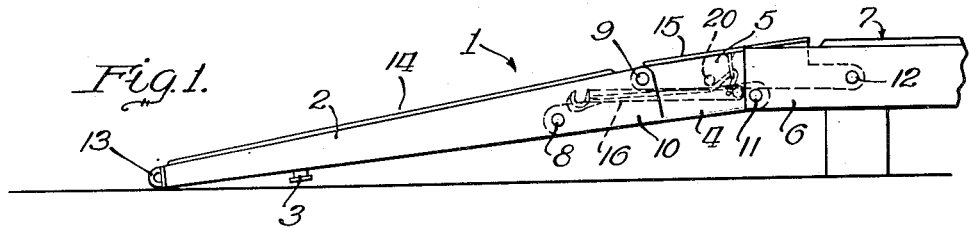
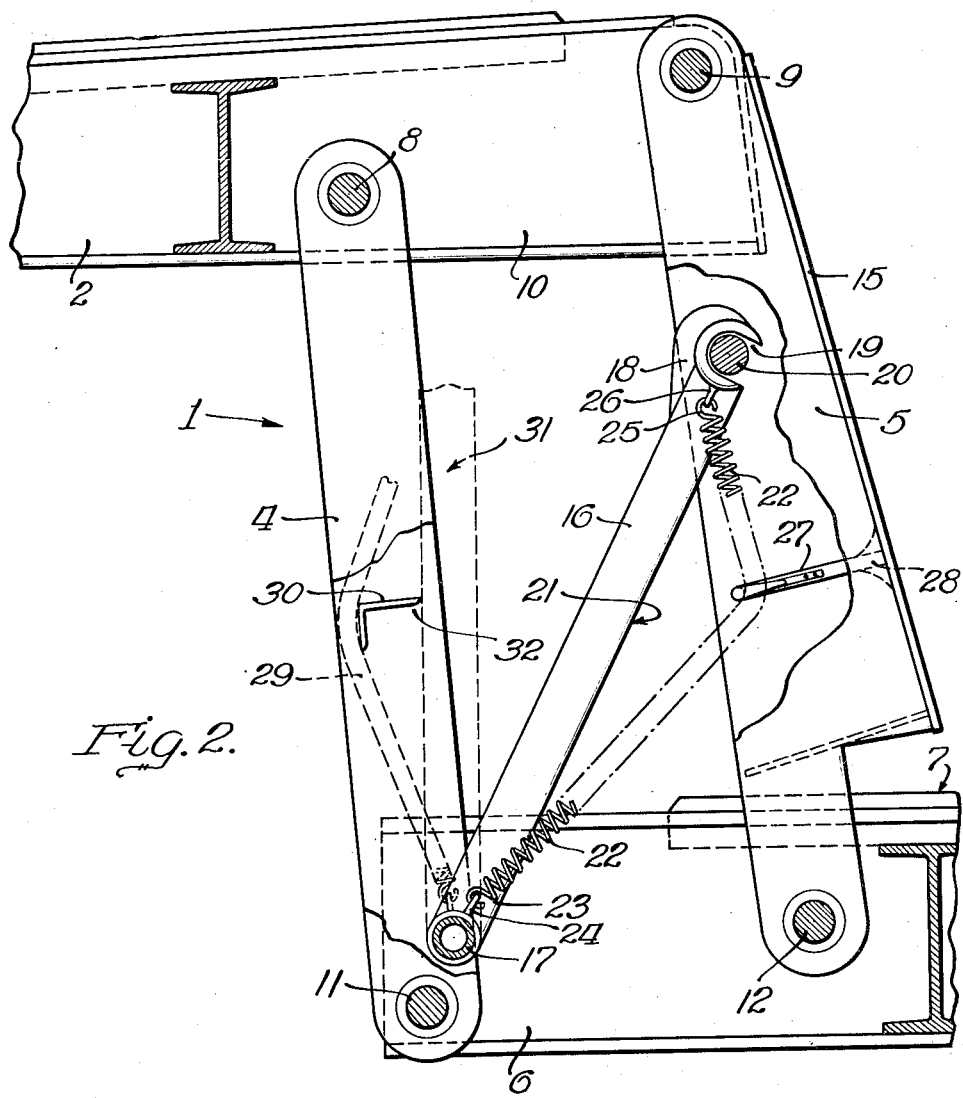

2,774,613
SAFETY LOCKING BAR FOR FOLDING TRAILER HITCH

William E. Martin, Kewanee, Ill.

Application December 4, 1951, Serial No. 259,799

4 Claims. (Cl. 280—415)

This invention relates to a safety bar designed and arranged to lock the movable parts of a foldable hitch unit which is associated with the front end of a flat bed trailer.

More specifically the present invention is related to a locking arrangement which is interposed between parallel pivoted links that are pivotally carried on the forward end of a trailer bed and which pivotally support a hitching tongue for purposes of connection with a fifth wheel of a tractor vehicle.

Various loading means may be used in connection with a flat bed of a machinery hauling trailer, and one such means is to provide the hitch mechanism for the trailer with movably connected parts that will permit the lowering of the normal hitching tongue which connects the trailer with a tractor vehicle into a ground engaging position so that the bed may be loaded over the tongue and from the forward end thereof. In such arrangements, the tongue comprises a loading ramp, and one of the operative links connected between the tongue and the bed is arranged with an intermediate platform for the purposes of closing the gap between the supporting ramp surface of the tongue and the supporting hauling surface of the bed. Hitch mechanisms of this type are normally raised and lowered by means of a winch cable and hook operated from the tractor vehicle by which cable and hook the forward end of the tongue can be raised from a ground engaging position to an elevated hitching position and so maintained by the winch mechanism until the tractor vehicle connects its fifth wheel structure with the hitch pin of the tongue.

When using a hitching construction of the type above explained, such an assembly is normally unstable excepting under the control of the winch mechanism and will not maintain its raised position independently of the cable means.

It is one of the main objects of the present invention to provide a safety bar as a stabilization means which will automatically lock the pivotally connected parts of the trailer hitch mechanism into a predetermined position wherein the tongue will be held in elevated relation for operative connection with a fifth wheel of a tractor vehicle.

Another object of the present invention is to provide a safety bar that not only locks the pivotally connected parts of the hitching mechanism in a predetermined raised position, but which also provides a reinforcing means that will considerably strengthen and distribute the stresses between the supporting links which hold the tongue in operable hitching position above the bed.

A further object of the present invention is to provide a safety bar which is interposed between the pivotal links of the hitching mechanism and which will prevent weaving or relative rocking between the bed and the tongue when a trailer of this type is connected with a towing vehicle. When considering the tongue and vehicle trailer bed in their vertically displaced horizontal positions and while under towing conditions, the tongue and bed are capable of relative motion horizontally under starting and stopping maneuvers as these hitch mechanisms are now conventionally constructed. With the addition of the safety bar, relative horizontal motion between the tongue and the bed is definitely restricted and confined only to the looseness between the connected parts which is substantially negligible.

It is another object of the present invention to provide the safety bar with associated means which will render the bar automatically operative to latch the movable parts of the hitching mechanism when the hitching tongue is raised from the ground.

Further objects of the invention include such means as a releasable bar holding mechanism which will normally maintain the bar out of its operative latching engagement under certain conditions of operation, and also such means which will automatically control the movements of the bar to effectively operate in its designed capacity.

Other objects and advantages relating to the safety bar means of the present invention shall hereinafter appear in the following detailed description having reference to the accompanying drawings forming a part of this specification.

In the drawings:

Fig. 1 is a side elevational view of the forward fragmentary portion of a flat bed trailer illustrating the hitch mechanism of the trailer in extended and lowered position wherein such tongue functions as a ramp for loading the trailer, this illustration incorporating the safety bar of the new and novel mechanism as the same appears in inoperative position;

Fig. 2 is a fragmentary view of the forward end of the trailer bed and the adjacent end of the hitching tongue and the connected mechanism all shown in raised and elevated position for connection with a fifth wheel with the safety bar of the present invention illustrated in operative position to lock the pivotally connected mechanisms in such raised positions;

Fig. 3 is a view substantially similar to the Fig. 2 illustration, but showing a modified construction and arrangement of the safety bar which functions to lock the pivotally connected parts of each mechanism; and Fig. 4 is a detail cross sectional view of a portion of the mechanism illustrated in Fig. 3 and substantially as viewed along the line 4—4 in Fig. 3.

Referring to Figs. 1 and 2, the hitching mechanism generally indicated at 1 comprises a hitching tongue 2 carrying a hitch pin 3, with the tongue connected by a pair of link structures 4 and 5 with the forward end 6 of a flat bed trailer 7. The link structures 4 and 5 may be of various designs, and one or more sets such as shown in Fig. 2 may be positioned laterally across the forward end of the trailer bed and connected with the tongue at spaced points laterally located along the rear end of the tongue 2. For purposes of explanation, the links 4 and 5 will merely be referred to as independent unitary structures having cooperative action to move the tongue 2 in a given relation with respect to the forward end 6 of the trailer bed 7.

The links 4 and 5 are pivotally connected on shafts 8 and 9 respectively with the rear end 10 of the hitching tongue 2 and are also pivotally supported upon the shafts 11 and 12 carried by the forward end 6 of the trailer bed 7. As shown in Fig. 2, the trailer and tongue are vertically spaced as determined by the general upright links 4 and 5 and the parts have been brought into this position through the use of a cable and hook which are connected to the eye 13 at the forward end of the tongue 2 for raising the structure from the Fig. 1 position into the Fig. 2 position. When this structure occupies the Fig. 1 position, the tongue 2 presents a suitable surface 14 over which vehicles being loaded may pass on to the trailer 7, while the link 5 is provided with a plate or other suitable means such as 15 to provide an intermediate connecting surface over which the vehicles may pass between the forwardly disposed tongue 2 and the bed 7 of the trailer.

As best shown in Fig. 2, the safety bar 16 is interposed between the links 4 and 5 to operate therebetween in a manner in which the entire structure shown in Fig. 2 may be locked into the position therein indicated. Safety bar 16 is pivotally carried upon a pipe 17 or other suitable pivotal means which is secured to the link structure 4. The outer free end of the bar 16 is provided with a hook structure 18 presenting an open slot 19 which is capable of passing over and receiving therein a locking shaft 20 that is carried by the link structure 5. As shown in Fig. 2, the bar 16 is in operative relation preventing any relative movement of the links 4 and 5 and thus firmly supporting the tongue 2 in elevated relation with respect to the bed 7.

When the hitching mechanism is in extended position as shown in Fig. 1, the safety bar 16 occupies a position adjacent the link structure 4 with the edge 21 thereof urged into engagement with the locking shaft 20 by suitable spring means that normally urge the safety bar in a clockwise direction. As the tongue 2 is raised by a winch cable attachment, the edge 21 of the safety bar 16 will normally follow in contact with the adjacent surface of the locking shaft 20 sliding therealong until the parts attain their Fig. 2 relationship, at which time the hook structure 18 will engage over the locking shaft 20 to confine the latter within the slot 19 in the hook structure. The parallel walls of the slot 19 are disposed at right angles to the length of the bar 16 to prevent separation of the hook 18 from the shaft 20 under stresses imposed along the bar 16 under operative conditions.

The spring means employed in the Fig. 2 construction comprises a single flexible spring 22 which has one end 23 hooked over an eye 24 that is fastened to the hub portion of the safety bar while the other end 25 of the spring is hooked through an eye 26 that is carried or secured to the hook portion 18 of the safety bar. A snap hook arrangement 27 is suitably secured at 28 to the link structure 5 for releasably retaining the spring 22 through the loop portion of the snap hook 27 and biasing the spring in the direction of the link structure 5 to thereby normally urge the safety bar 16 in a clockwise direction upon its pivot 17. As the links 4 and 5 move downwardly and forwardly, the spring 22 slides through the end of the snap hook 27 and finally assumes a position as generally indicated in Fig. 1 when the safety bar 16 is disposed in unlatched position.

By releasing the spring 22 from the snap hook 27, and biasing the spring in the opposite direction as shown in dotted lines at 29 about a suitable stub bracket 30, the safety bar 16 may be held in the dotted line position indicated at 31 which will render this bar inoperative whenever that relationship is desired. When the safety bar 16 is in the broken line position 31, the same will normally bear against the outer end 32 of the stub bracket 30 and will thus be held out of active and automatic latching engagement with the locking shaft 20.

With this construction, therefore, the hitching mechanism of a trailer is provided with a means for locking the parts in operative towing position and for maintaining such parts in the relationship illustrated in Fig. 2. Furthermore, the link structure 4, which is normally a tension link mechanism, will be capable of distributing some of the tension forces through the safety bar 16 to the link structure 5 as transmitted thereto by the locking shaft 20. By the same token, the link structure 5 which comprises a compression unit, will be able to distribute some of its compressive forces through the locking shaft 20 to be transmitted through the safety bar 16 and into the pivotal mounting 17 of the forward link structure 4 to be absorbed through the latter and into the pivotal mounting at 11 carried by the forward end of the bed 7.

In this connection, it should also be noted that the arrangement of the connected points of the locking bar with the link structures 4 and 5 are such that they are substantially aligned with the pivotal shaft 11 so that any upward stresses acting upon the safety bar 16 will pull directly through the fixed and anchored point comprising the shaft 11, thus preventing any torque stresses that would tend to swing the link structure 4 about the shaft 11. Similarly, any compressive forces induced into the safety bar through the shaft 20 and link structure 5 will be directed substantially in line with the anchored shaft 11 so that these forces will also be incapable of introducing any torque forces which would tend to rotate the link structure 4 upon its pivotal mounting shaft 11. This particular arrangement of locking bar positioned as it is and acting in the capacity described provides a very efficient locking means which decidedly strengthens the swingable link mechanism of the hitching mechanism and which is very effectively operable in the capacity for which it was designed.

When the hitching mechanism is desired to be lowered, the cable from the winch may be connected at the eye 13 to slightly raise the forward end of the torque 2 to release the hook portion 18 frictionally from the shaft 20 so that the safety bar 16 may be swung counterclockwise out of its locking engagement. The bar 16 may be so held or else the spring 22 may be shifted from the spring hook 27 to the bracket 30 to hold the safety bar in inoperative position. Obviously, if the bar 16 is held away from the locking shaft 20, a slight downward movement of the hitching structure will immediately cause the shaft 20 to engage the edge 21 of the locking bar, which condition will automatically hold such bar out of operative locking engagement with the link structure 5.

Referring to Figs. 3 and 4, the locking bar 33 here illustrated is pivotally carried at 34 upon links 35 and presents a latching hook 36 which engages over a locking shaft 37 carried by a link 38. The links 35 and 38 are pivotally connected by shafts 39 and 40 with the hitching tongue 41 and are mounted upon shafts 42 and 43 carried by the forward end 44 of the trailer bed 45.

This particular arrangement of safety bar 33 includes a latch hook 46 that is oppositely related to the locking hook 36 and which is capable of latching engagement with a bar 47 to hold the safety bar 33 as shown in dotted lines at the link 35 in Fig. 3. The latch bar 47 is slidably carried in a bracket 48 mounted upon an angle support 49 connected with the links 35. The bar 47 carries two stop pins 50 and 51. A suitable leaf spring 52 is connected with the angle 49 and urges the bar 47 upwardly by engagement with the pin 51. To release the latching bar 47 from hook 46 when these parts are connected, an operator may pull the hand knob 53 which is connected to the bar 47 downwardly to release the latch hook 46. Downward movement of the bar 47 is limited by the pin 50 engaging the bracket 48.

Referring to Fig. 4, the locking bar 33 normally is urged in a clockwise direction about pivotal mounting 34 by means of the torsion spring 54. The torsion spring is coiled about the pivot structure 34 and has one end held against a fixed pin 55 that is carried by one link 35, and the other end 56 of the spring is looped about the safety locking bar 33 as best shown in Fig. 3 urging the same in a clockwise direction.

With this arrangement, the locking bar 33 is normally urged toward the link structure 38 and the lock shaft 37 by the coil spring 54. If the bar is to be rendered inoperative, the same may be swung in the direction of the arrow 57 and into latching engagement with the latch bar 47. Pulling down on the hand knob 53 will thereafter easily release the safety bar 33 so that the same is again actively urged in a clockwise direction under the action of the spring 54 to carry out its function of Although several forms of the present invention have been described and illustrated, certain further modifications are contemplated without departing from the fundamental concept of the invention. All such further changes or other arrangements in the combination of parts shall be governed by the breadth and scope of the appended claims.

What I claim is:

1. A self-locking hitch mechanism for a trailer comprising a hitch tongue, a support on the trailer bed, fore and aft pivotal shafts on said tongue, fore and aft pivotal shafts on said support, a ling connecting said forward shafts, a link connecting the rearward shafts, and a motion locking means interposed between said links comprising a safety bar, pivotal means to swingably carry one end of said bar on one link to permit the other end of said bar to swing freely relative to said links, a latching element on the other of said links, and a releasable latch means supported upon the freely swingable end of said bar and arranged to connect with said latching element on the other of said links; said pivotal means, said bar and said element all being disposed along a line intersecting one of said pivotal shafts when said bar is disposed in latched position with said element whereby stresses in either direction through said link bar are directed through said one pivotal shaft and its associated mounting.

2. A self-locking hitch mechanism for a trailer comprising a hitch tongue, a support on the trailer bed, fore and aft pivotal shafts on said tongue, fore and aft pivotal shafts on said support, a link connecting said forward shafts, a link connecting the rearward shafts, and a motion locking means interposed between said links comprising a safety bar, pivotal means to swingably carry one end of said bar on one link to permit the other end of said bar to swing freely relative to said links, a latching element on the other of said links, and a releasable latch means supported upon the freely swingable end of said bar and arranged to connect with said latching element on the other of said links; said pivotal means, said bar, and said element all being disposed along a line intersecting one of said pivotal shafts when said bar is disposed in latched position with said element whereby stresses in either direction through said bar are directed through said one pivotal shaft and its associated mounting, said latch means comprising a hook member having a notch to receive said element, with the walls of said hook member being arranged at right angles to the length of said swingable safety bar.

3. In a self-locking hitch mechanism for a trailer of the character set forth and defined in claim 1, but wherein a bar restraining mechanism is incorporated therein to selectively hold said bar in an inert and inoperative position in relation to said latching element comprising releasable coacting hook and hook engaging members carried by said bar and by said one link, respectively.

4. In a self-locking hitch mechanism for a trailer of the character set forth and defined in claim 1, but wherein a bar restraining mechanism is incorporated therein to selectively hold said bar in an inert and inoperative position in relation to said latching element comprising releasable coacting hook and hook engaging members carried by said bar and by said one link, respectively, and resilient means connected with said bar and arranged to normally urge the bar in a direction for operative latching engagement with said latching element upon release of said hook and hook engaging members.

References Cited in the file of this patent

UNITED STATES PATENTS

| 650,629 | Brown | May 29, 1900 |
| 2,431,436 | Townsend | Nov. 25, 1947 |
| 2,441,710 | Martin | May 18, 1948 |
| 2,443,611 | Ferguson | June 22, 1948 |
| 2,452,789 | Pike | Nov. 2, 1948 |
| 2,471,277 | Martin | May 24, 1949 |

FOREIGN PATENTS

| 548,013 | Germany | Apr. 5, 1932 |
| 323,305 | Great Britain | Jan. 2, 1930 |